US007357333B2

(12) United States Patent
Gilfix

(10) Patent No.: US 7,357,333 B2
(45) Date of Patent: Apr. 15, 2008

(54) MECHANISM FOR STORING AUTHENTICITY INFORMATION ABOUT A WRITTEN OR PRINTED DOCUMENT

(75) Inventor: Michael A. Gilfix, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 11/126,116

(22) Filed: May 10, 2005

(65) Prior Publication Data

US 2006/0255123 A1 Nov. 16, 2006

(51) Int. Cl.
*G06K 19/06* (2006.01)

(52) U.S. Cl. ............... 235/494; 235/380; 235/491; 382/115

(58) Field of Classification Search ............ 235/494, 235/380, 491; 382/115; 345/179
See application file for complete search history.

(56) References Cited

U.S. PATENT DOCUMENTS

| | | | |
|---|---|---|---|
| 4,797,938 A | 1/1989 | Will ........................ 382/7 |
| 5,623,347 A * | 4/1997 | Pizzanelli .................. 359/2 |
| 6,085,977 A | 7/2000 | James et al. ............. 235/449 |
| 6,212,285 B1 | 4/2001 | Bender et al. ........... 382/100 |
| 6,256,110 B1 | 7/2001 | Yoshitani ................. 358/1.9 |
| 6,293,715 B1 | 9/2001 | James et al. ............. 400/73 |
| 6,381,344 B1 * | 4/2002 | Smithies et al. ......... 382/115 |
| 6,464,147 B1 | 10/2002 | Hayosh .................... 235/493 |
| 6,685,296 B2 | 2/2004 | Mochizuki et al. ........ 347/19 |
| 6,724,374 B1 | 4/2004 | Lapstun et al. |
| 6,738,050 B2 * | 5/2004 | Comiskey et al. ........ 345/173 |
| 6,753,830 B2 * | 6/2004 | Gelbman .................. 345/55 |
| 6,760,470 B1 | 7/2004 | Bogosian et al. ......... 382/139 |
| 6,806,453 B1 | 10/2004 | Vincent et al. |
| 7,198,341 B1 | 4/2007 | Rast |
| 7,262,764 B2 * | 8/2007 | Wang et al. .............. 345/179 |
| 2002/0167500 A1 | 11/2002 | Gelbman |
| 2005/0219224 A1 | 10/2005 | Liebenow |
| 2005/0255435 A1 * | 11/2005 | Redford et al. ......... 434/307 R |
| 2006/0020469 A1 * | 1/2006 | Rast ........................ 704/270 |

(Continued)

FOREIGN PATENT DOCUMENTS

JP 2004210432 A 7/2004

OTHER PUBLICATIONS

"Magnetic Ink Character Reader Job Accounting Control for the 3835 MICR Printer System", IBM Technical Disclosure Bulletin, vol. 34, No. 5, 1991, pp. 315-318.

(Continued)

*Primary Examiner*—Steven S. Paik
(74) *Attorney, Agent, or Firm*—Duke W. Yee; Casimer K. Salys; Catherine K. Kinslow

(57) ABSTRACT

A mechanism for storing authenticity information about a written or printed document. This authenticity information may be stored in a publicly-accessible database. When a document patterned with electronic ink is to be verified, the verifier examines the electronic ink under magnification. The verifier locates start and end pattern markers within the ink, and extracts the pattern from the ink. Once the pattern is obtained, the verifier performs a lookup of the pattern in the database. If the pattern is found, the verifier obtains information associated with the pattern from the database. The verifier may then use this information to verify the authenticity of the document.

2 Claims, 2 Drawing Sheets

U.S. PATENT DOCUMENTS

| | | |
|---|---|---|
| 2006/0022949 A1 | 2/2006 | Bathiche |
| 2006/0028451 A1* | 2/2006 | Bathiche ................... 345/170 |
| 2006/0080609 A1* | 4/2006 | Marggraff .................. 715/727 |
| 2006/0114500 A1* | 6/2006 | Ha ............................ 358/1.15 |
| 2006/0159345 A1* | 7/2006 | Clary et al. ................ 382/186 |
| 2006/0159838 A1* | 7/2006 | Kowalski et al. ............ 427/58 |
| 2006/0169787 A1 | 8/2006 | Gelbman |
| 2006/0218171 A1 | 9/2006 | Wakeam et al. |
| 2006/0224610 A1* | 10/2006 | Wakeam et al. ............ 707/101 |
| 2006/0233464 A1* | 10/2006 | Simmons .................... 382/321 |
| 2007/0024551 A1* | 2/2007 | Gelbman ..................... 345/85 |

OTHER PUBLICATIONS

New Mechanism for Ensuring Authenticity of Written and Printed Documents, Gilfix et al.

* cited by examiner

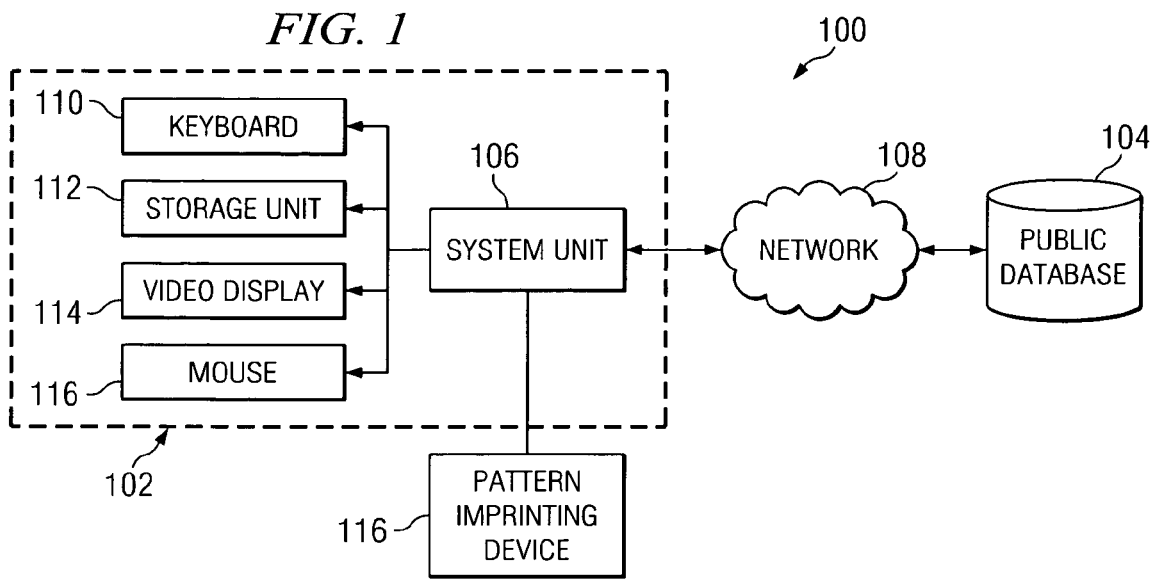
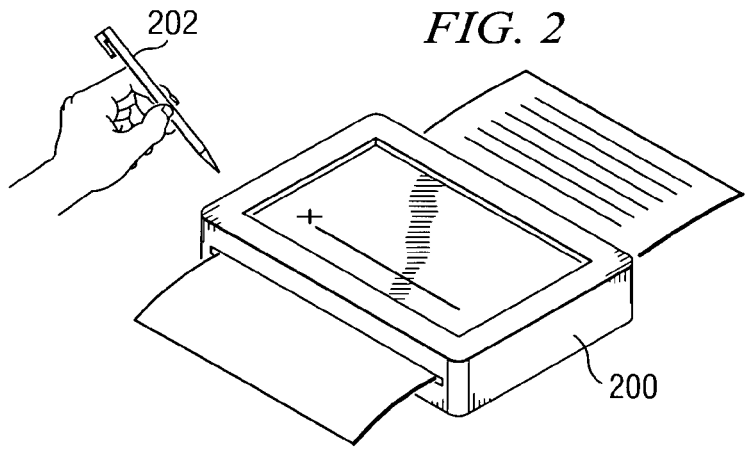

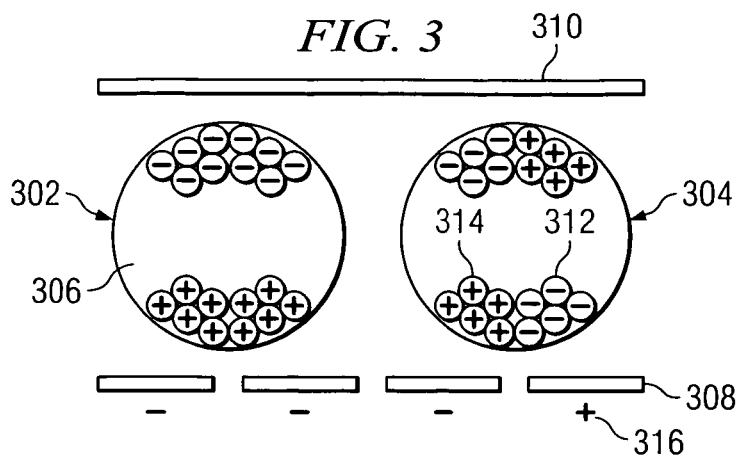
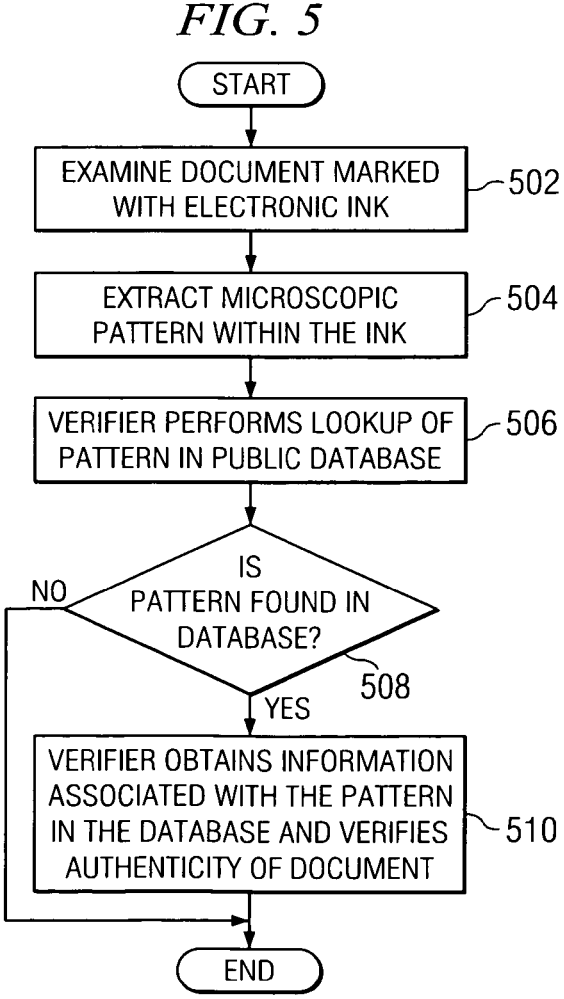

MECHANISM FOR STORING AUTHENTICITY INFORMATION ABOUT A WRITTEN OR PRINTED DOCUMENT

CROSS REFERENCE TO RELATED APPLICATIONS

This application is related to commonly assigned U.S. patent application Ser. No. 11/126,114 entitled, "New Mechanism for Ensuring Authenticity of Written and Printed Documents", filed on May 10, 2005 and hereby incorporated by reference.

BACKGROUND OF THE INVENTION

1. Technical Field

The present invention relates generally to document verification, and in particular, to a mechanism for storing authenticity information about a written or printed document.

2. Description of Related Art

In the current art, there are various mechanisms for verifying that a document was provided from the original party. For example, certificates of authenticity or holograms are used to offer proof that a document is authentic. These certificates or holograms are typically attached to the document, an official stamp, or special paper used for printing. Written signatures are also used to provide another degree of authenticity. Written signatures are typically taken at face value, as handwriting is considered hard to forge.

However, as printing technology improves at a considerable rate, mechanisms for proving a document is authentic have become increasingly important in raising the bar for forgers. Written documents also pose a problem, since forgers can imitate the handwriting and ink color to produce "official" looking documents. In view of the need for raise the bar to make forgery more difficult, this invention focuses on another mechanism that may be used to replace or augment some of these current authentication practices.

Thus, it would be advantageous to have a mechanism for ensuring the authenticity of written and printed documents.

SUMMARY OF THE INVENTION

The present invention provides a mechanism for storing authenticity information about a written or printed document. This authenticity information may be stored in a publicly-accessible database. When a document patterned with electronic ink is to be verified, the verifier examines the electronic ink under magnification. The verifier locates start and end pattern markers within the ink, and extracts the pattern from the ink. Once the pattern is obtained, the verifier performs a lookup of the pattern in the database. If the pattern is found, the verifier obtains information associated with the pattern from the database. The verifier may then use this information to verify the authenticity of the document.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of an authenticity information system in which the present invention may be implemented;

FIG. 2 is a block diagram of an example authenticity information system comprising a public database and a device having a surface for receiving a written signature and capable of generating a patterned electric field to affect the ink in accordance with a preferred embodiment of the present invention;

FIG. 3 is an illustration of a known electronic ink material;

FIG. 4 is an example bit pattern to be associated with an issuer or signer of a document in accordance with a preferred embodiment of the present invention; and FIG. 5 is a flowchart of a process for verifying the authenticity of written or printed documents in accordance with a preferred embodiment of the present invention.

DETAILED DESCRIPTION OF THE PREFERRED EMBODIMENT

The present invention provides a mechanism for storing authenticity information about printed and handwritten documents. In the illustrative examples of the present invention, patterns comprising authenticity information may be embedded into electronic ink, which is a fluid material currently for use in electronic displays. Electronic ink contains magnetically charged pigments in the fluid that can be altered by applying a current to the "ink". Traditionally, the ink is sandwiched between two glass substrates to keep it in a liquid state, and a patterned electric field is applied to the ink to orient black and white pigments in a manner as to create the desired text or images on a surface. Electronic ink may be placed within a writing utensil, such as, for example, a pen, or within an ink cartridge, or a combination of both. The writing utensil may be used to provide a handwritten "signature" to a document. The word "signature" as used herein shall mean any handwriting which is to be verified and can include a name, a group of code letters, or words, or symbols. In addition, the ink cartridge may be used in a printing device. The printing device may use the electronic ink in the cartridge to print the document and then automatically embed authenticity information in the ink.

When a document is marked (e.g., signed or printed) with electronic ink, that mark is visible to the naked eye. The document may be placed upon or adjacent to a special surface, wherein the special surface applies a patterned electric field to the electronic ink while the ink is still wet. The field is used to imprint a microscopic pattern invisible to a user within the ink. The document may then be left to dry (e.g., like a normal signed document or the document may be cured with UV light), making the imprinted pattern immutable. Once dry, the authenticity of the document may be verified by visually examining by magnification the pattern in the ink to determine the signer or issuer of the document. Thus, while the signature or print is visible to a user in a normal manner, the pattern embedded within the signature or print may be detectable only with the aid of a magnification device.

As many different patterns may be imprinted into the electronic ink within the document, it would be beneficial to a document verifier to have a way of associating the pattern imprinted in the document with the issuer or signer of the document, and storing this association and other information related to the document in a public database. The patterns embedded in the ink may represent unique identifiers that are associated with and are used to identify entities or events, such as an individual, an organization, or an occurrence. In one example, a pattern may be a bit string that represents some kind of unique identification (ID) with a low probability of collision (e.g., cryptographic checksum). When the document is to be verified, the verifier may look up the embedded pattern ID in the public database. This look up may be performed by querying the database directly. Alternatively, the look up may be performed using a graphical user interface to enter the bit pattern or its corresponding data. The information associated with the pattern ID may be used to verify the authenticity of the document. This information may include, but is not limited to, information regarding the entity or event associated with the pattern, the document publish date, etc.

The particular ID structure used to implement the present invention may be any type of ID structure that allows for identifying the issuer or signer of the document. For instance, the ID may be a serial number, similar to radio frequency identification (RFID). RFID is a generic term for technologies that use radio waves to automatically identify people or objects. There are several methods of identification, but the most common is to store a "serial number" that identifies a person or object, and perhaps other information, on a microchip that is attached to an antenna. The "serial number" may be used to specify the unique, numerical identifier of the entity or event in order to distinguish one pattern in the ink from another. In another example, the ID may also be a public key, such as used as part of a digital signing scheme. Public keys are numbers associated with a particular entity or event, and are intended to be known to everyone who needs to verify the authenticity of a document. To verify the document, a cryptographic checksum may be used to create the public key for an entity or event. A cryptographic checksum is a fixed and unique alphanumeric representation of a document, and may be created by applying a special algorithm to the content of the document. Using the cryptographic checksum to generate a public key allows for a low probability of collision, since it is highly unlikely that two files will hash to the same value.

The bit pattern may be embedded in the ink using a current to generate a patterned electric field to force particular pigments to the top surface of the ink when wet. For instance, while particular pigment particles (e.g., a set of black pigments which together as a group are visible to the naked eye) are brought to the top to create a visible mark on the document, the colored pigments used for the pattern (e.g., a number of white pigments only visible under magnification) are pushed to the top surface only to form the desired pattern in the visible black pigment particles. Likely choices for the visible pigment color and pattern pigment color may be based on high contrast, i.e., black and white, blue and white, etc.

Binary values may be assigned to the pigments, such as a value of 0 for the black pigments, and a value of 1 for the white pigments. Special markers may be used to determine when the pattern starts and ends. The markers may then be "escaped" within the string.

The bit pattern is imprinted at a very high resolution to make the pattern invisible to the naked eye. The pattern may be viewed with the assistance of a magnification device, such as a magnifying glass, microscope, or magnetic scanner. The verifier analyzes the document under magnification to determine the start and end markers of the bit pattern. Once these markers are found, the verifier may extract the embedded pattern ID and compare this ID against pattern entries in the public database. If a pattern match is found, the verifier may determine that the entity or event associated with the pattern is the signer or the issuer of the document.

With reference now to the figures and in particular with reference to FIG. 1, a pictorial representation of an authenticity information system in which the present invention may be implemented is depicted in accordance with a preferred embodiment of the present invention. In this illustrative example, authenticity information system 100 comprises a computer 102 and a public database 104. Database 104 could equally well be private, such as through the use of a secure network. Computer 102 is depicted which includes system unit 106, keyboard 110, storage unit 112, which may include floppy drives and other types of permanent and removable storage media, video display terminal 114, and mouse 116. Additional input devices may be included with personal computer 102, such as, for example, a joystick, touchpad, touch screen, trackball, microphone, and the like. System unit 106 may comprise one or more processors for executing computer readable program code. Computer 102 may be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 102 may also include a graphical user interface (GUI) that may be implemented by means of systems software residing in computer readable media in operation within computer 102.

Public database 104 may be connected to computer 102 via network 108. Network 108 may include connections, such as wire, wireless communication links, or fiber optic cables. In the depicted example, network 108 is the Internet with network 108 representing a worldwide collection of networks and gateways that use the Transmission Control Protocol/Internet Protocol (TCP/IP) suite of protocols to communicate with one another. Of course, network 108 also may be implemented as a number of different types of networks, such as for example, an intranet, a local area network (LAN), or a wide area network (WAN). In an alternative embodiment, public database 104 may be connected directly to computer 102.

In one preferred embodiment, public database 104 is a publicly-accessible database, such as, for example, a Web Services database. A client application on computer 102 may access information stored in the database by sending a request over network 108. For example, when a user wants to verify the authenticity of a document, the user may submit the pattern embedded in the electronic ink to the database. The database responds to the request by sending information corresponding to the pattern to the requesting computer. This information may include, but is not limited to, information regarding the entity (e.g., individual, company, etc.) or event associated with the pattern, the document publish date, etc.

Authenticity information system 100 may also comprise a pattern imprinting mechanism 116. Pattern imprinting mechanism 116 may be connected to computer 102 via wire links, wireless communication links, or fiber optic cables. In the depicted example, pattern imprinting mechanism 116 comprises a surface that is capable of generating a patterned electric field. When a document containing electronic ink is placed in the vicinity of the field, the pattern created by the field affects electronic ink by imprinting a pattern within the ink. For example, pattern imprinting mechanism 116 may include circuitry that comprises a series of inputs on a grid. This circuitry may be any type commonly used in digital circuitry, such as basic logic technology, programmable arrays, and the like. A pattern, such as a serial number digital pattern, may be applied to the input nodes of the chip to produce the pattern in the ink.

Those of ordinary skill in the art will appreciate that the hardware depicted in FIG. 1 may vary. The depicted example is not meant to imply architectural limitations with respect to the present invention.

Turning now to FIG. 2, a block diagram of an example pattern imprinting surface in accordance with a preferred embodiment of the present invention. Pattern imprinting surface 200 may be implemented as pattern imprinting device 116 shown in FIG. 1. In this illustrative example, pattern imprinting surface 200 comprises a surface which receives a written signature. Writing utensil 202 is filled with electronic ink and is used to produce a written signature. As pattern imprinting surface 200 captures the handwritten input, the surface applies a patterned electric field to the ink. The field is applied at any time before the ink dries and sets. For example, the field may be applied after the entire signature has been written, or, alternatively, the field may be applied while the ink is being placed on the document. The grid size and necessary current may be very small, such as in the range of microAmperes, so as to have fine grain control over the pattern.

Although the foregoing description exemplifies one illustrative method of placing electronic ink onto a document, those skilled in the art after having the benefit of this disclosure, will realize that this is but one example of a way to apply electronic ink to a document, and this should be considered as exemplary and not limiting as to how electronic ink may be applied in difference embodiment of the present invention. For example, instead of using a writing utensil to apply electronic ink to the document, an ink cartridge within a printing device may be used. In another example, instead of having the document placed over the special surface before the signature is written, the signature may be written first and then the special surface may be moved over or under the document to imprint a pattern in the ink. These are all considered to be within the spirit and scope of the illustrative examples of the present invention.

Turning now to FIG. 3, an illustration of an exemplary known electronic ink material is shown. In particular, the electronic ink shown in FIG. 3 is a technology created by Eink Corporation. The electronic ink is comprised of microcapsules, such as microcapsules 302 and 304, which contain oppositely charged black and white pigment subcapsules floating in clear fluid 306. The microcapsules are sandwiched between bottom electrode 308 and top transparent electrode 310. In the depicted example, black pigment chips 312 are negatively charged, and white pigment chips 314 are positively charged. When an electric field is applied to the electronic ink, the pigments either rise to the top or fall to the bottom of the fluid, depending on the electrical charge. As shown, if bottom electrode 308 is at a positive potential (voltage) 316, the negatively charged black pigment chips 312 are attracted to the bottom of the fluid, while white pigment chips 314 are repelled to the top. In this manner, the patterns of white and black pigments can then be created to form text and images.

In an alternative embodiment, a patterned magnetic field could be used to pattern electric ink having magnetically polarized pigment chips.

Although the illustrative embodiments of the present invention are described with regards to "electronic ink", it should be noted that the term "electronic ink" in this invention comprises not only currently available inks such as that developed by Eink Corporation, but the present invention may be implemented using any technology that allows for orienting microscopic pigments in a fluid and fixing the pigments in a pattern. In one example, the technology may include a fast drying, moderately viscous, clear fluid with flecks of colored electrically charged or magnetically polarized material. When a thin amount of the fluid is applied to the paper, the imprint is put in place before the fluid dries. Using a fast drying fluid ensures that the material will quickly be stuck in place with the pattern. The consistency of the fluid could be chosen to minimize imprinting errors. In addition, the properties of the fluid will dictate how fast the pattern must be imprinted to lock the pattern in the ink before the ink dries.

FIG. 4 is an example bit pattern to be associated with an issuer or signer of a document in accordance with a preferred embodiment of the present invention. Example bit pattern 400 shown in FIG. 4 may be imprinted into the electronic ink by applying a field to the ink. The field causes the pigments to be selectively driven to the top or bottom surfaces. Binary values may be assigned to the pigments, such as a value of 0 402 for the black pigments, and a value of 1 404 for the white pigments. Markers, such as, for example, 0000 406, may be used to indicate the beginning of the pattern and the ending of the pattern. A verifier uses the markers to extract the pattern from the ink.

For example, as shown in FIG. 3, if white pigments (with a binary value of 1) are positively charged, applying a negative field to the ink from below will drive the white pigments to the bottom surface. The negatively charged black pigments (with a binary value of 0) are repelled to the top surface. Likewise, applying a positive field to the ink will force the white pigments to the top surface and the black pigments to the bottom surface. In this manner, the field is used to orient black and white pigments in a manner as to create a binary bit pattern within the electronic ink.

FIG. 5 is a flowchart of a process for verifying the authenticity of written or printed documents in accordance with a preferred embodiment of the present invention. The process described in FIG. 5 may be implemented in authenticity information system 100 in FIG. 1.

The process begins with examining a document that has been marked with electronic ink (step 502). The ink may have been deposited on the document in various ways, such as using a pen filled with electronic ink to mark the document or using a printer to print the document, wherein an ink cartridge deposits the ink onto the document. The ink deposition may comprise, for example, a signature, text, or images on the document. A verifier may analyze the electronic ink on the document under magnification. For instance, the document may be examiner with the assistance of a magnifying glass, microscope, or a scanner.

The verifier then extracts the microscopic pattern within the ink (step 504). The verifier may identify the pattern in the ink with the aid of special markers in the ink. These special markers are used to indicate the start and end of the pattern.

Once the pattern is obtained, the verifier performs a lookup on a database containing various pattern entries and associated information for each pattern entry (step 506). A determination is then made as to whether the pattern extracted from the ink is in the database (step 508). If a pattern match is not found, the authenticity of the document is not verified, and the process terminates thereafter.

If a pattern match is found, the verifier then obtains information associated with the found pattern entry in the database (step 510). The associated information may then be used to verify the authenticity of the document. For example, the information may include the name and details of the entity that signed or issued the document, events pertaining to the document, the publication date, etc.

Thus, the present invention provides a mechanism for determining whether a document is valid or is a forgery. The mechanism of the present invention ensures the authenticity of printed and handwritten documents by examining patterns imprinted within electronic ink and performing a lookup of the pattern in a public database to obtain information associated with the pattern. This information may include details regarding the signer/issuer of the document. This information may then be used to verify that a document was provided by the original party.

It is important to note that while the present invention has been described in the context of a fully functioning data processing system, those of ordinary skill in the art will appreciate that the processes of the present invention are capable of being distributed in the form of instructions or computer readable program code embodied in a computer readable medium and a variety of forms and that the present invention applies equally regardless of the particular type of signal bearing media actually used to carry out the distribution. The computer readable program code includes instructions and/or data. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for verifying authenticity of a physical document, the method comprising:
   examining a handwritten signature in the physical document formed in patterned electronic ink;
   extracting a microscopic pattern embedded in the handwritten signature formed in the patterned electronic ink;
   obtaining information associated with the extracted microscopic pattern from a database; and
   verifying the authenticity of the handwritten signature in the physical document using the information obtained from the database;
   wherein the pattern embedded in the handwritten signature is visible to a user only under magnification.

2. A method for verifying authenticity of a physical document, the method comprising:
   examining a handwritten signature in the physical document formed in patterned electronic ink;
   extracting a microscopic pattern embedded in the handwritten signature formed in the patterned electronic ink;
   obtaining information associated with the extracted microscopic pattern from a database; and
   verifying the authenticity of the handwritten signature in the physical document using the information obtained from the database;
   wherein the document is examined under magnification.

* * * * *